T. J. Sloan,
Steam-Boiler Indicator,
N°. 10,912.   Patented May 16, 1854.
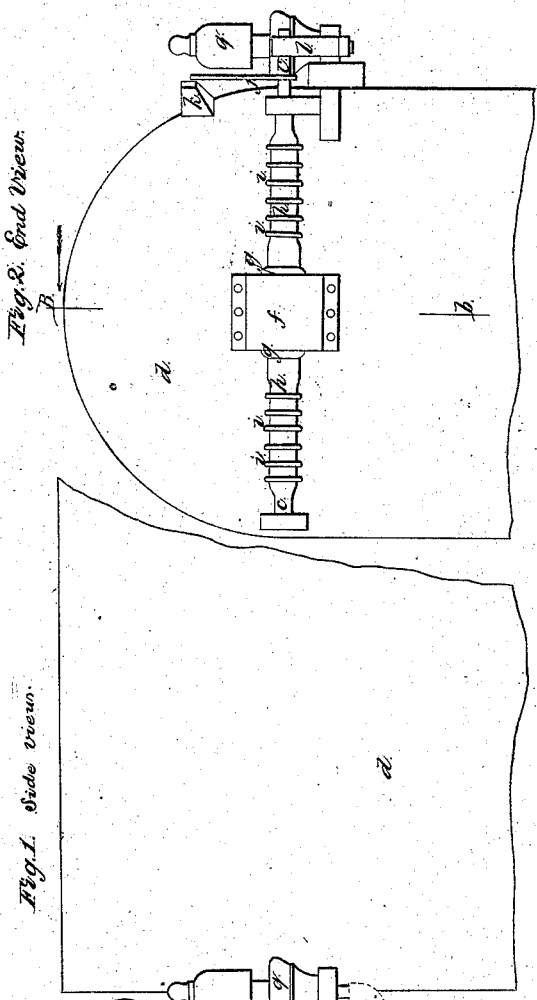
Fig. 2. End View.
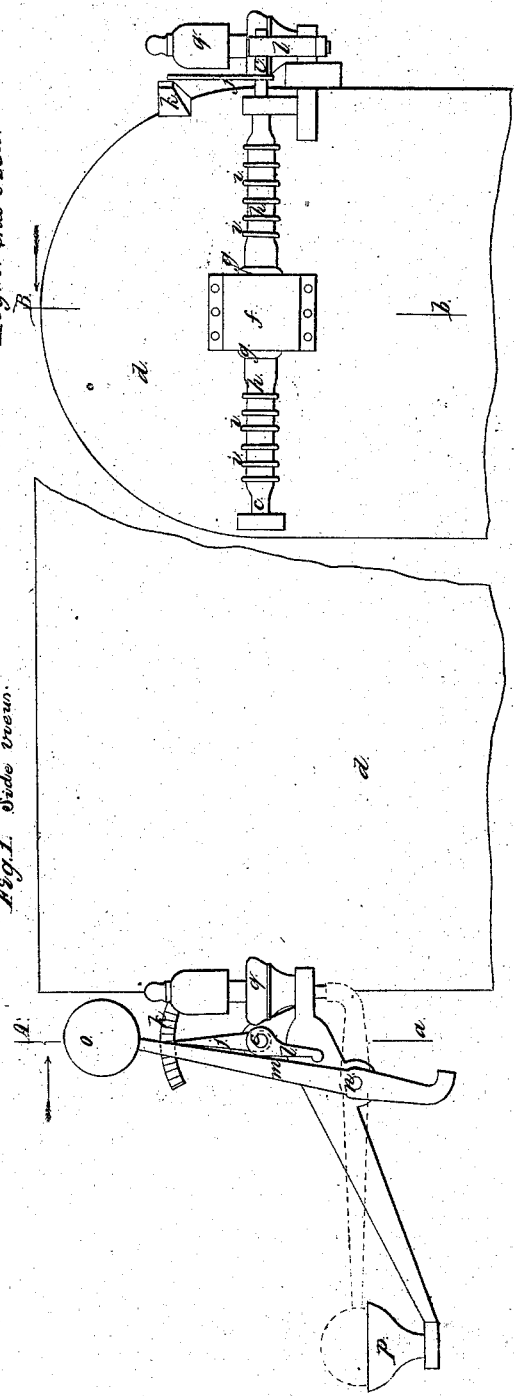
Fig. 1. Side View.
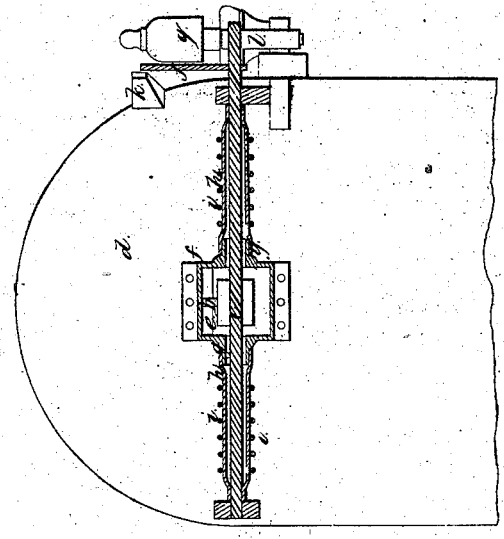
Fig. 3.
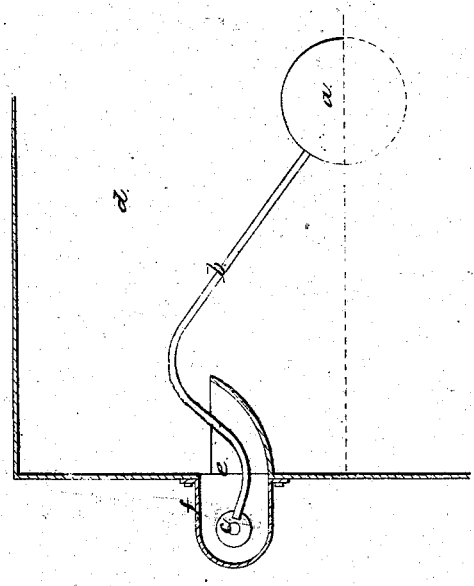
Fig. 4.

UNITED STATES PATENT OFFICE.

THOMAS J. SLOAN, OF NEW YORK, N. Y.

WATER-INDICATOR FOR STEAM-BOILERS.

Specification of Letters Patent No. 10,912, dated May 16, 1854.

*To all whom it may concern:*

Be it known that I, THOMAS J. SLOAN, of the city, county, and State of New York, have invented certain new and useful Improvements in the Method of Indicating the Level of Water or other Fluids in Boilers and other Vessels, of which the following is a full, clear, and exact description, reference being had to the accompanying drawings, making part of this specification, in which—

Figure 1, is a side elevation; Fig. 2, an end elevation; Fig. 3, a vertical section taken at the line A, $a$, of Fig. 1; and Fig. 4, another vertical section at the line B, $b$, of Fig. 2.

The same letters indicate like parts in all the figures.

The use of a float within a boiler or other closed vessel as a means of indicating the level of water or other fluid has been attended with difficulty for the want of a suitable contrivance for forming the connection between the boiler inside and the indicator outside. The connection, it is obvious, must be made through a steam and liquid proof joint. This has generally been effected by means of a stuffing box, which is defective for this purpose for the reason that the friction is variable and too great to insure the proper working of an apparatus necessarily delicate. The float, to follow the varying level of the water, must be free to work, which cannot be the case if the connection is formed through a stuffing box of the usual construction. And the means heretofore employed to indicate by an alarm when the fluid descends to a dangerous level have been defective for want of an apparatus capable of giving a loud and practically efficient alarm, and yet sufficiently sensitive and delicate to be operated by the float in following the varying level of the fluid. These difficulties I have overcome by my invention which consists in connecting the float inside of the boiler or other vessel with the indicator or mechanism outside, by passing the shaft or other equivalent instrument through an aperture or apertures in the said boiler or other vessel, of sufficient size to admit of working therein without touching, and connecting the said shaft or its equivalent with the aperture or apertures by means of a sleeve or sleeves of flexible material, such as thin vulcanized india rubber secured to the shaft, or its equivalent, and around the aperture or apertures, so as to form perfectly fluid tight joints and yield by its flexibility to the vibrations, as the float follows the varying level of the liquid within the vessel.

In the accompanying drawings $a$, represents a float, such as heretofore used in steam boilers, attached to the end of an arm $b$, on a horizontal shaft $c$, hung on suitable bearings outside the boiler $d$. The arm $b$, passes through a large hole $e$, in the boiler, and this hole is surrounded by a casing $f$, which extends around the shaft $c$, which passes through holes in the two sides of the said casing. The holes are so large that the shaft will turn therein without touching, and each is formed with a collar $g$. To the outside of each of these collars, is properly secured with a steam tight joint, one end of a flexible tube $h$, made of thin vulcanized india rubber or other equivalent substance, the other end being secured in like manner to the corresponding end of the shaft.

The tube should be made of a cylindrical form, except at the end, which should be one smaller and the other larger, the diameter of the body being so much larger than the shaft so as to avoid touching and rubbing. The longer these tubes or sleeves are, the more flexible they will be, and therefore the better. To prevent them from being expanded by the pressure of steam, &c., within, they are surrounded by small loops or rings $i$, $i$. The shaft being thus mounted on suitable bearings outside the vessel and the connection between it and the holes in the casing attached to the boiler, formed by the flexible tubes or sleeves, the escape of steam &c. will be effectually prevented and the motion of the float will only be impeded by the said flexible sleeves, which, from their flexibility, will afford a slight and, what is important, a constant resistance.

On one end, the shaft $c$, carries an index hand $j$, which acts as a pointer, and in connection with a scale $k$, indicates at all times the level of the water. The shaft carries another arm $l$, which, when the water reaches the low water mark, strikes against the weighted arm of a lever $m$, when in the position represented in Fig. 1. This lever $m$ is hung, and turns on a fulcrum pin $n$, and one end carries a weight $o$. When in the position represented, the weight is above the axis of motion and a little beyond a vertical line, so that a very slight force will throw it over the balance and cause it to fall over by gravity, the weight gradually gaining in leverage as it descends toward a cup $p$, by which it is arrested; but, in falling, the other arm of the said lever strikes against and operates a steam whistle $q$, or any other alarm with a sufficient power due—not to the force of the float, but to the falling weight which is simply carried past its balance by the float. In this way, a true indication of the level of water or other fluid in a boiler, and other vessel, can be obtained, on which the attendant can rely, and if no one be present, an efficient alarm will be given when the level reaches a dangerous point.

It will be obvious from the foregoing that many changes may be made in the form and arrangement of the means employed for carrying into practical effect the nature of the two parts of my invention, and therefore I wish it to be distinctly understood that I do not limit myself to the special construction and arrangement of the several parts so long as the same results are obtained by the substitution of equivalent means.

What I claim as my invention and desire to secure by Letters Patent is—

Connecting the float, inside the boiler or other vessel, with the indicator or other mechanism outside by means of a flexible sleeve or sleeves, or the equivalent thereof, substantially as and for the purpose specified.

THOS. J. SLOAN.

Witnesses:
WM. A. BISHOP,
SAMUEL LEGGETT.